(12) United States Patent
Kageyama et al.

(10) Patent No.: US 11,143,293 B2
(45) Date of Patent: Oct. 12, 2021

(54) POWER TRAIN DEVICE FOR VEHICLES

(71) Applicant: Mazda Motor Corporation, Hiroshima (JP)

(72) Inventors: Keitaro Kageyama, Higashihiroshima (JP); Shotaro Nagai, Hiroshima (JP); Takashi Ishiyama, Higashihiroshima (JP); Takuya Sugisawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/760,243

(22) PCT Filed: Oct. 23, 2018

(86) PCT No.: PCT/JP2018/039323
§ 371 (c)(1),
(2) Date: Apr. 29, 2020

(87) PCT Pub. No.: WO2019/093118
PCT Pub. Date: May 16, 2019

(65) Prior Publication Data
US 2020/0355262 A1 Nov. 12, 2020

(30) Foreign Application Priority Data
Nov. 9, 2017 (JP) .............................. JP2017-216072

(51) Int. Cl.
*F16H 61/00* (2006.01)
*F16H 61/02* (2006.01)

(52) U.S. Cl.
CPC ..... *F16H 61/0031* (2013.01); *F16H 61/0267* (2013.01); *F16H 2061/0037* (2013.01);
(Continued)

(58) Field of Classification Search
CPC ............. F16H 61/0031; F16H 61/0267; F16H 2061/0037; F16H 2061/0279; F16H 2200/201; F16H 2312/14
See application file for complete search history.

(56) References Cited

U.S. PATENT DOCUMENTS 5,845,756 A * 12/1998 Dairokuno ............. B60K 23/02
192/85.61
7,951,043 B2 * 5/2011 Reisch ................ F16H 61/0031
477/156

(Continued)

FOREIGN PATENT DOCUMENTS

CN 104343967 A 2/2015
DE 102005013137 A1 9/2006
(Continued)

*Primary Examiner* — Tisha D Lewis
(74) *Attorney, Agent, or Firm* — Alleman Hall Creasman & Tuttle LLP

(57) ABSTRACT

A power train device for a vehicle is provided with a selector valve that is switched between a first state in which oil discharged from an electric oil pump is able to be supplied as a hydraulic fluid to an engagement hydraulic chamber of a vehicle-starting frictional engagement element, and a second state in which the oil is able to be supplied as a lubricating oil to the vehicle-starting frictional engagement element through a first lubricating oil supply circuit, depending on a magnitude of a discharge pressure of a mechanical oil pump.

2 Claims, 8 Drawing Sheets

(52) U.S. Cl.
CPC ............... *F16H 2061/0279* (2013.01); *F16H 2200/201* (2013.01); *F16H 2312/14* (2013.01)

(56) References Cited

U.S. PATENT DOCUMENTS

| | | |
|---|---|---|
| 10,012,310 B2 * | 7/2018 | Saji .................... F16H 61/0276 |
| 2009/0232673 A1 | 9/2009 | Reisch et al. |
| 2015/0027570 A1 | 1/2015 | Wi et al. |
| 2015/0367793 A1 * | 12/2015 | Ishikawa ................ B60L 1/003 180/65.25 |
| 2016/0298759 A1 | 10/2016 | Saji et al. |
| 2017/0307065 A1 | 10/2017 | Buchmann et al. |

FOREIGN PATENT DOCUMENTS

| | | |
|---|---|---|
| DE | 102015201107 A1 | 7/2016 |
| JP | 2003-166558 A | 6/2003 |
| JP | 2012-013144 A | 1/2012 |
| JP | 2013-217492 A | 10/2013 |
| JP | 2016-031144 A | 3/2016 |
| JP | 2016-056838 A | 4/2016 |
| WO | 2016047018 A1 | 3/2016 |

* cited by examiner

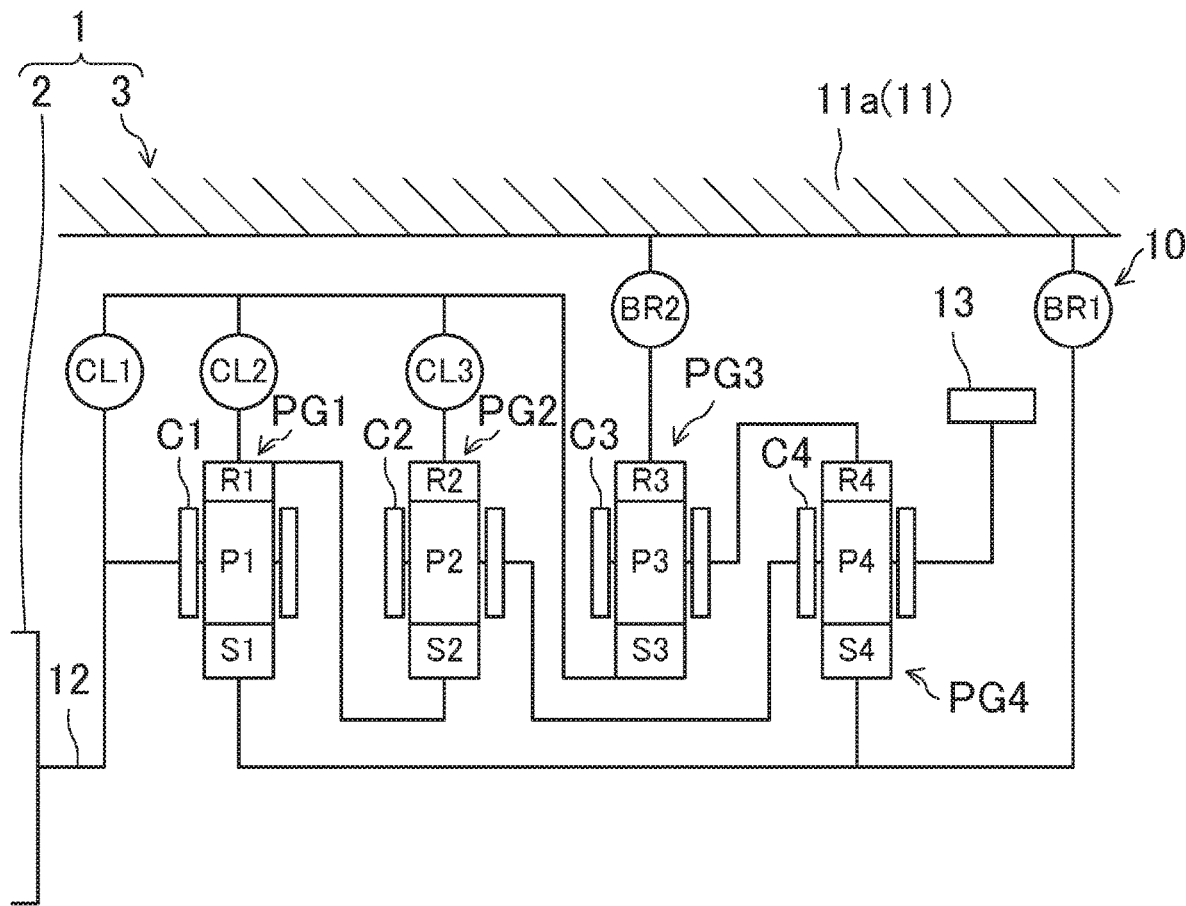

POWER TRAIN DEVICE FOR VEHICLES

BACKGROUND

The present invention relates to a power train device for vehicles.

BACKGROUND ART

A power train device for vehicles has been known. The power train device includes a drive source (such as an engine or a motor) for driving a vehicle, a transmission which receives power transmitted from the drive source, a mechanical oil pump mechanically driven by the drive source, and an electric oil pump driven by an electric motor different from the drive source (see, e.g., Patent Document 1). The electric oil pump is operated while the drive source is stopped (i.e., while the mechanical oil pump is stopped) to ensure a hydraulic pressure required for the transmission.

According to Patent Document 1, a selector valve (solenoid valve) is provided for a discharge oil passage of the electric oil pump. The selector valve connects the discharge oil passage to either one of a hydraulic supply passage that supplies a hydraulic fluid discharged from the electric oil pump to a hydraulic system for a transmission mechanism, or a cooling system oil passage that supplies the hydraulic fluid to a cooling/lubricating system for the transmission mechanism. The electric oil pump is operated while the mechanical oil pump is stopped, and the selector valve is controlled in accordance with the pressure of the oil supplied to the hydraulic system for the transmission mechanism. This configuration attempts to avoid restarting performance of the vehicle from lowering after the stop of the mechanical oil pump, and a clutch from seizing at the restart of the vehicle.

Furthermore, there has been known a transmission having a start clutch which is brought into a fully engaged state from a released state via a slipping state through the supply of a hydraulic fluid to an engagement hydraulic chamber at the start of the vehicle (see, e.g., Patent Document 2).

CITATION LIST

Patent Document

Patent Document 1: Japanese Unexamined Patent Publication No. 2016-031144
Patent Document 2: Japanese Unexamined Patent Publication No. 2003-166558

SUMMARY

Technical Problem

In the case where the transmission is provided with a vehicle-starting frictional engagement element, such as the start clutch as described in Patent Document 2, a large amount of lubricating oil is required for cooling and lubricating the vehicle-starting frictional engagement element particularly when the vehicle-starting frictional engagement element is slipping, and the oil (lubricating oil) supplied only from the mechanical oil pump may be insufficient for lubricating the vehicle-starting frictional engagement element. When the mechanical oil pump is upsized, a large amount of lubricating oil may be supplied to the vehicle-starting frictional engagement element even when such a large amount of lubricating oil is unnecessary (e.g., when the vehicle-starting frictional engagement element is fully engaged). This may increase a loss in stirring the lubricating oil by a rotary member of the vehicle-starting frictional engagement element, resulting in deterioration in fuel economy.

To cope with this drawback, the electric oil pump may be operated at the start of the vehicle in addition to the mechanical oil pump to supply the oil also from the electric oil pump to the vehicle-starting frictional engagement element. In this case, a selector valve (e.g., a solenoid valve) as described in Patent Document 1 is provided, so that the oil from the electric oil pump is supplied as the hydraulic fluid to the engagement hydraulic chamber of the vehicle-starting frictional engagement element while the mechanical oil pump is stopped (note that the pressure of the hydraulic fluid is set to be low which is just before the slip), and as the lubricating oil to the vehicle-starting frictional engagement element while the mechanical oil pump is in operation and particularly when the vehicle-starting frictional engagement element is slipping, through control of the selector valve.

However, such a configuration requires an expensive selector valve such as a solenoid valve, and the control of the selector valve as well.

In view of the foregoing, it is therefore an object of the present invention to provide a power train device for a vehicle with a simple circuit configuration. The power train device is able to supply oil (hydraulic fluid) from an electric oil pump to an engagement hydraulic chamber of a vehicle-starting frictional fastening element while a mechanical oil pump is stopped, and to supply oil (lubricating oil) from the electric oil pump to the vehicle-starting frictional engagement element while the mechanical oil pump is in operation and particularly when the vehicle-starting frictional engagement element is slipping.

Solution to the Problem

In order to achieve the above object, the present invention is directed to a power train device for a vehicle. The power train device includes: a drive source that drives the vehicle; a transmission that receives power transmitted from the drive source; a mechanical oil pump mechanically driven by the drive source; an electric oil pump driven by an electric motor different from the drive source; a vehicle-starting frictional engagement element that is provided for the transmission and is engaged at the start of the vehicle through supply of a hydraulic fluid to an engagement hydraulic chamber; and a selector valve that is switched between a first state in which oil discharged from the electric oil pump is able to be supplied as a hydraulic fluid to the engagement hydraulic chamber of the vehicle-starting frictional engagement element, and a second state in which the oil discharged from the electric oil pump is able to be supplied as a lubricating oil to the vehicle-starting frictional engagement element through a first lubricating oil supply circuit, depending on a magnitude of a discharge pressure of the mechanical oil pump.

In this configuration, the selector valve is switched between the first state and the second state depending on the magnitude of the discharge pressure of the mechanical oil pump. Specifically, the discharge pressure of the mechanical oil pump is zero while the mechanical oil pump is stopped, and becomes a predetermined line pressure when the mechanical oil pump is operated. Depending on the difference between these pressures, the selector valve can be switched to the first state at least when the electric oil pump is in operation while the mechanical oil pump is stopped, and to the second state when the mechanical oil pump is in operation. As a result, an expensive selector valve such as a solenoid valve for the switching, and the control of the selector valve are no longer necessary. Thus, such a simple circuit configuration makes it possible to perform switching between the supply of the oil (hydraulic fluid) from the electric oil pump to the engagement hydraulic chamber of the vehicle-starting frictional fastening element while the mechanical oil pump is stopped, and the supply of the oil (lubricating oil) from the electric oil pump can be supplied to the vehicle-starting frictional engagement element while the mechanical oil pump is in operation and particularly when the vehicle-starting frictional engagement element is slipping.

In an embodiment of a hydraulic control system of the automatic transmission, the selector valve is configured to be brought into the first state while the mechanical oil pump is stopped, and into the second state when the mechanical oil pump is in operation, and to be able to supply oil discharged from the mechanical oil pump as the hydraulic fluid to the engagement hydraulic chamber of the vehicle-starting frictional engagement element while the selector valve is in the second state. The power train device further includes: a pressure regulator that regulates a pressure of the oil supplied as the hydraulic fluid to the engagement hydraulic chamber of the vehicle-starting frictional engagement element while the selector valve is in the second state; and a lubrication control valve arranged in a second lubricating oil supply circuit that supplies the oil from the mechanical oil pump as the lubricating oil to the vehicle-starting frictional engagement element without passing through the selector valve when the mechanical oil pump is in operation. The lubrication control valve is operated in accordance with a differential pressure between a line pressure and a regulated pressure which is regulated by the pressure regulator, and is operated such that a flow rate of the oil supplied to the vehicle-starting frictional engagement element through the second lubricating oil supply circuit when the differential pressure exceeds a predetermined threshold value becomes greater than a flow rate of the oil when the differential pressure is equal to or lower than the predetermined threshold value.

This configuration makes it possible to supply a sufficient amount of lubricating oil to the vehicle-starting frictional engagement element from both of the first and second lubricating oil supply circuits particularly when the vehicle-starting frictional engagement element is slipping. If the predetermined threshold value is set such that the differential pressure between the line pressure and the regulated pressure regulated by the pressure regulator becomes greater than the predetermined threshold value when the slip occurs, the lubrication control valve can increase the flow rate of the oil supplied to the vehicle-starting frictional engagement element through the second lubricating oil supply circuit. After the vehicle-starting frictional engagement element is fully engaged, the differential pressure basically becomes equal to or lower than the predetermined threshold value. Thus, the lubrication control valve can reduce the flow rate of the oil supplied to the vehicle-starting frictional engagement element through the second lubricating oil supply circuit. Thus, with such a simple circuit configuration, the amount of lubricating oil supplied from the mechanical oil pump to the vehicle-starting frictional engagement element can be regulated. Accordingly, a sufficient amount of lubricating oil can be supplied to the vehicle-starting frictional fastening element particularly when the vehicle-starting frictional engagement element is slipping, and the amount of the lubricating oil supplied to the vehicle-starting frictional fastening element can be reduced when a large amount of lubricating oil is unnecessary, e.g., when the vehicle-starting frictional engagement element is fully engaged. Reducing the amount of lubricating oil supplied to the vehicle-starting frictional engagement element makes it possible to reduce the loss in stirring the lubricating oil by a rotary member of the vehicle-starting frictional fastening element, thereby keeping fuel economy from deterioration.

In the embodiment described above, the first lubricating oil supply circuit is preferably connected to the vicinity of a downstream end of the second lubricating oil supply circuit.

In this configuration, the first lubricating oil supply circuit is connected to a portion of the second lubricating oil supply circuit where the oil pressure is relatively low, which can reduce the pressure of the lubricating oil supplied from the electric oil pump to the vehicle-starting frictional engagement element via the first and second lubricating oil supply circuits.

Advantages of the Invention

As can be seen in the foregoing, according to the power train device of the present invention, the selector valve that is switched between the first state and the second state depending on the magnitude of the discharge pressure of the mechanical oil pump is provided. With such a simple circuit configuration, the oil (hydraulic fluid) from the electric oil pump can be supplied to the engagement hydraulic chamber of the vehicle-starting frictional fastening element while the mechanical oil pump is stopped, and the oil (lubricating oil) from the electric oil pump can be supplied to the vehicle-starting frictional engagement element while the mechanical oil pump is in operation and particularly when the vehicle-starting frictional engagement element is slipping.

BRIEF DESCRIPTION OF THE DRAWINGS

FIG. 1 is a schematic diagram illustrating a power train device for a vehicle according to an exemplary embodiment.

FIG. 2 is an engagement table showing engagement states of frictional engagement elements at each gear position of a transmission of the power train device.

DESCRIPTION OF EMBODIMENTS

Figure 3:
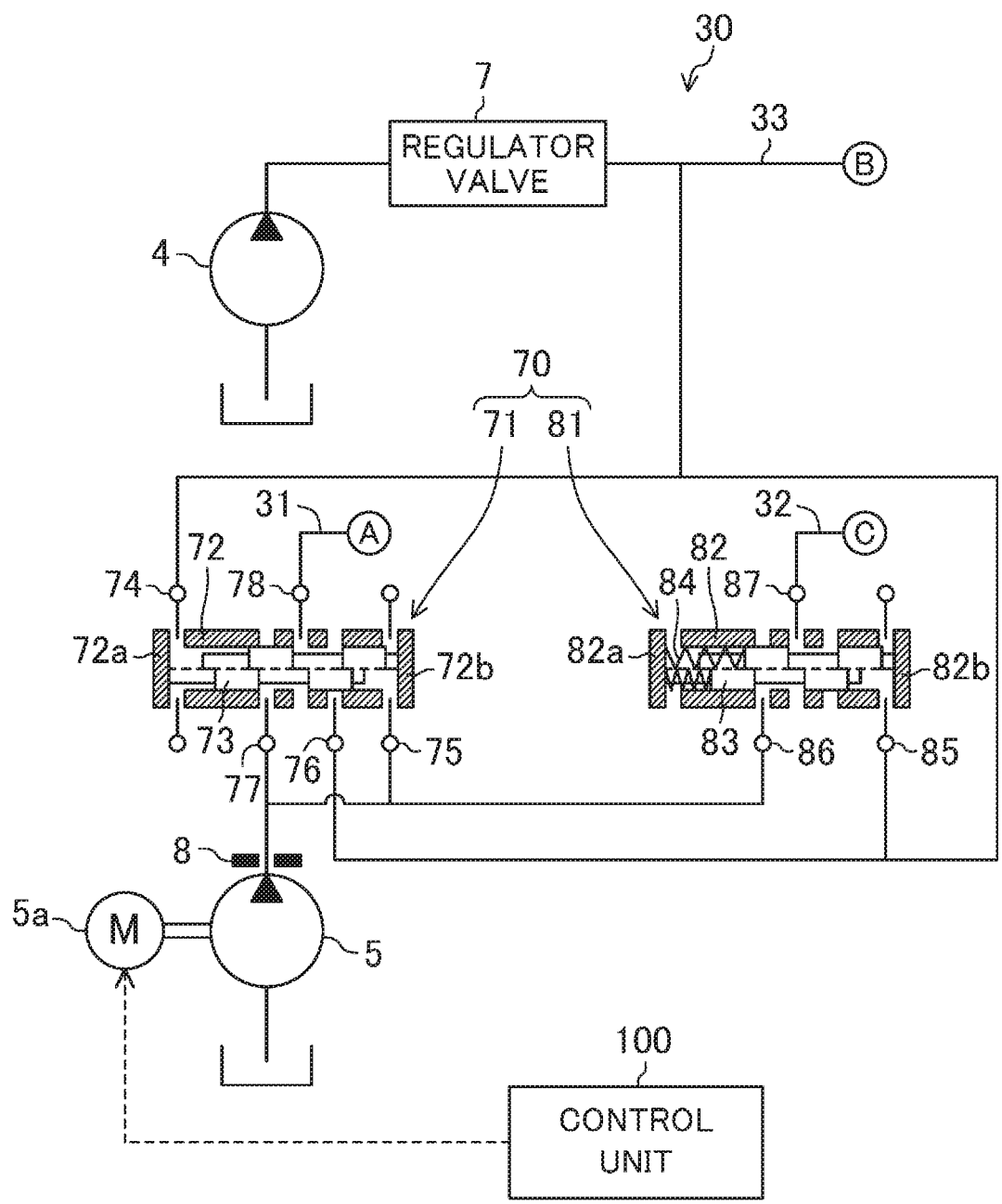
FIG. 3 is a circuit diagram illustrating part of a hydraulic control circuit of the transmission, i.e., the periphery of a first selector valve and a second selector valve.

An exemplary embodiment will be described in detail with reference to the drawings.

FIG. 1 shows a power train device 1 for a vehicle according to the exemplary embodiment. The power train device 1 includes an engine 2 as a drive source that drives the vehicle, and a transmission 3 that receives power transmitted from the engine 2. The drive source is not limited to the engine, and may be a motor or the like.

In the present embodiment, the vehicle is provided with an idle reduction system. The idle reduction system executes idle reduction control, i.e., automatically stops the engine 2 if a predetermined stop condition is met while the vehicle is stopped, and automatically restarts the engine 2 if a predetermined restart condition is met while the engine 2 is automatically stopped. Note that a driver of the vehicle can prohibit the execution of the idle reduction control.

The transmission 3 is an automatic transmission with eight forward gears and a single reverse gear. The transmission 3 includes a cylindrical transmission case 11, and a transmission mechanism 10 arranged in the transmission case 11 and receives power inputted from the engine 2.

The transmission mechanism 10 includes an input shaft 12 corresponding to an input portion of the transmission 3, and an output gear 13 corresponding to an output portion of the transmission 3. The input shaft 12 is directly connected to an output shaft of the engine 2. That is, in this embodiment, no torque converter is provided between the output shaft of the engine 2 and the input shaft 12 of the transmission 3. In this embodiment, the engine 2 and the transmission 3 are mounted on the vehicle and coupled to each other so that the output shaft of the engine 2 and the input shaft 12 extend in a width direction of the vehicle. The output gear 13 is arranged in the transmission case 11 on the side opposite to the engine 2 (on the right side in FIG. 1). Although not shown, the power transmitted to the output gear 13 is transmitted to an input gear of a differential mechanism via a countershaft input gear and a countershaft output gear arranged on a countershaft extending parallel to the input shaft 12. The power is transmitted to driving wheels (front wheels) of the vehicle via the differential mechanism.

The transmission mechanism 10 further includes a first planetary gear set PG1 (will be hereinafter referred to as a "first gear set PG1"), a second planetary gear set PG2 (a "second gear set PG2"), a third planetary gear set PG3 (a "third gear set PG3"), and a fourth planetary gear set PG4 (a "fourth gear set PG4"), which are arranged side by side in an axial direction of the input shaft 12 (an axial direction of the transmission 3). The first, second, third, and fourth gear sets PG1, PG2, PG3, and PG4 are arranged in this order from the side of the engine 2 between the input shaft 12 and the output gear 13, and form a plurality of power transmission paths from the input shaft 12 to the output gear 13. The input shaft 12, the output gear 13, and the first to fourth gear sets PG1 to PG4 are arranged on the same axis.

The transmission mechanism 10 further includes five frictional engagement elements (a first clutch CL1, a second clutch CL2, a third clutch CL3, a first brake BR1, and a second brake BR2) for selecting and switching to one of the plurality of power transmission paths formed by the first to fourth gear sets PG1 to PG4.

The first gear set PG1 has a first sun gear S1, a first ring gear R1, and a first carrier C1 as rotating elements. The first gear set PG1 is a single pinion gear set, in which a plurality of pinions P1 which is supported by the first carrier C1 and spaced apart from each other in a circumferential direction of the first gear set PG1 meshes with both of the first sun gear S1 and the first ring gear R1.

The second gear set PG2 has a second sun gear S2, a second ring gear R2, and a second carrier C2 as rotating elements. The second gear set PG2 is also a single pinion gear set, in which a plurality of pinions P2 which is supported by the second carrier C2 and spaced apart from each other in a circumferential direction of the second gear set PG2 meshes with both of the second sun gear S2 and the second ring gear R2.

The third gear set PG3 has a third sun gear S3, a third ring gear R3, and a third carrier C3 as rotating elements. The third gear set PG3 is also a single pinion gear set, in which a plurality of pinions P3 which is supported by the third carrier C3 and spaced apart from each other in a circumferential direction of the third gear set PG3 meshes with both of the third sun gear S3 and the third ring gear R3.

The fourth gear set PG4 has a fourth sun gear S4, a fourth ring gear R4, and a fourth carrier C4 as rotating elements. The fourth gear set PG4 is also a single pinion gear set, in which a plurality of pinions P4 which is supported by the fourth carrier C4 and spaced apart from each other in a circumferential direction of the fourth gear set PG4 meshes with both of the fourth sun gear S4 and the fourth ring gear R4.

The first sun gear S1 is always connected to the fourth sun gear S4, the first ring gear R1 to the second sun gear S2, the second carrier C2 to the fourth carrier C4, and the third carrier C3 to the fourth ring gear R4. The input shaft 12 is always connected to the first carrier C1, and the output gear 13 to the second and fourth carriers C2 and C4.

The first clutch CL1 is configured to connect and disconnect the input shaft 12 and the first carrier C1 to and from the third sun gear S3. The first clutch CL1 is arranged in the transmission case 11 at an end of the gear sets toward the engine 2 and near a peripheral wall 11a of the transmission case 11.

The second clutch CL2 is configured to connect and disconnect the first ring gear R1 and the second sun gear S2 to and from and the third sun gear S3. The second clutch CL2 is arranged radially outside of the first ring gear R1 and near the peripheral wall 11a of the transmission case 11.

The third clutch CL3 is configured to connect and disconnect the second ring gear R2 to and from the third sun gear S3. The third clutch CL3 is arranged radially outside of the second ring gear R2 and near the peripheral wall 11a of the transmission case 11.

The first brake BR1 is configured to connect and disconnect the first sun gear S1 and the fourth sun gear S4 to and from the transmission case 11. The first brake BR1 is arranged in the transmission case 11 at an end of the gear sets opposite to the engine 2 and near the peripheral wall 11a of the transmission case 11.

The second brake BR2 is configured to connect and disconnect the third ring gear R3 to and from the transmission case 11. The second brake BR2 is arranged radially outside of the third ring gear R3 and near the peripheral wall 11a of the transmission case 11.

The frictional engagement elements are engaged through supply of a hydraulic fluid to engagement hydraulic chambers of the frictional engagement elements. As shown in an engagement table of FIG. 2, three of the five frictional engagement elements are selectively engaged to shift the transmission to the first to eighth forward gears and the single reverse gear. The engagement table shown in FIG. 2 indicates that the frictional engagement elements with circle symbols are engaged, and those with blanks are not engaged (released).

Specifically, shift to the first gear is made when the first clutch CL1, the first brake BR1, and the second brake BR2 are engaged. Shift to the second gear is made when the second clutch CL2, the first brake BR1, and the second brake BR2 are engaged. Shift to the third gear is made when the first clutch CL1, the second clutch CL2, and the second brake BR2 are engaged. Shift to the fourth gear is made when the second clutch CL2, the third clutch CL3, and the second brake BR2 are engaged. Shift to the fifth gear is made when the first clutch CL1, the third clutch CL3, and the second brake BR2 are engaged. Shift to the sixth gear is made when the first clutch CL1, the second clutch CL2, and the third clutch CL3 are engaged. Shift to the seventh gear is made when the first clutch CL1, the third clutch CL3, and the first brake BR1 are engaged. Shift to the eighth gear is made when the second clutch CL2, the third clutch CL3, and the first brake BR1 are engaged. Shift to the reverse gear is made when the third clutch CL3, the first brake BR1, and the second brake BR2 are engaged. In the sixth gear, the input shaft 12 and the output gear 13 rotate at the same speed.

As shown in FIG. 3, the power train device 1 further includes a mechanical oil pump 4 mechanically driven by the engine 2, and an electric oil pump 5 driven by an electric motor 5a different from the drive source (engine 2) for driving the vehicle. Oil discharged from the electric oil pump 5 passes through an orifice 8.

During the automatic stop of the engine 2 under the idle reduction control, the oil discharged from the electric oil pump 5 is supplied as a hydraulic fluid to the engagement hydraulic chambers of the frictional engagement elements to be engaged to shift the transmission to the first gear, i.e., the first clutch CL1, the first brake BR1, and the second brake BR2, so that these frictional engagement elements are maintained in an engaged state or a ready-to-engage state. Thus, when the engine 2 is restarted, the vehicle can be quickly started in response to a start operation (stepping down on an accelerator pedal) by the driver of the vehicle.

In this embodiment, during the automatic stop of the engine 2 under the idle reduction control, the first clutch CL1 and the first brake BR1 are fully engaged, and the second brake BR2 is brought into the ready-to-engage state. The second brake BR2 corresponds to a vehicle-starting frictional engagement element. That is, at the start of the vehicle, the mechanical oil pump 4 supplies the hydraulic fluid to an engagement hydraulic chamber 21 (see FIG. 4) of the second brake BR2 with the first clutch CL1 and the first brake BR1 engaged, which brings the second brake BR2 in the ready-to-engage state into the fully engaged state via a slipping state.

During the stop of the vehicle under no idle reduction control, the oil discharged from the mechanical oil pump 4 is supplied as the hydraulic fluid to the hydraulic pressure chambers of the first clutch CL1, the first brake BR1, and the second brake BR2 to bring the first clutch CL1 and the first brake BR1 into a fully engaged state, and the second brake BR2 into the ready-to-engage state. Then, at the start of the vehicle, the mechanical oil pump 4 supplies the hydraulic fluid to the engagement hydraulic chamber 21 (see FIG. 4) of the second brake BR2 with the first clutch CL1 and the first brake BR1 engaged, which brings the second brake BR2 in the ready-to-engage state into the fully engaged state via the slipping state.

In this context, the ready-to-engage state is a state where the hydraulic fluid at a low pressure which is just before the slip is supplied to the engagement hydraulic chamber 21 of the second brake BR2 to reduce (or preferably eliminate) clearances between a plurality of friction plates 23 (see FIG. 4) of the second brake BR2. When the pressure of the hydraulic fluid increases in this state, the second brake BR2 can be immediately brought into the slipping state. In this embodiment, the clearances can be reduced by means of a spring 25 (see FIG. 4) which will be described later.

When the engine 2 restarts and the mechanical oil pump 4 is operated, the oil discharged from the mechanical oil pump 4 is supplied as the hydraulic fluid to the engagement hydraulic chambers of the first clutch CL1, the first brake BR1, and the second brake BR2. Then, at the start of the vehicle, the supply of the hydraulic fluid from the mechanical oil pump 4 brings the second brake BR2 into the fully engaged state via the slipping state.

In this embodiment, even when the engine 2 restarts and the mechanical oil pump 4 is operated, the electric oil pump 5 continues to be operated for a specific period including a period during which the second brake BR2 is slipping and a period until a predetermined period has passed since the second brake BR2 was fully engaged thereafter, so that the oil discharged from the electric oil pump 5 is supplied as the lubricating oil to the second brake BR2 (in particular, the friction plates 23) through a first lubricating oil supply circuit 32 which will be described later. Even at the start of the vehicle which has been stopped under no idle reduction control, the electric oil pump 5 is operated for the specific period.

Figure 4:
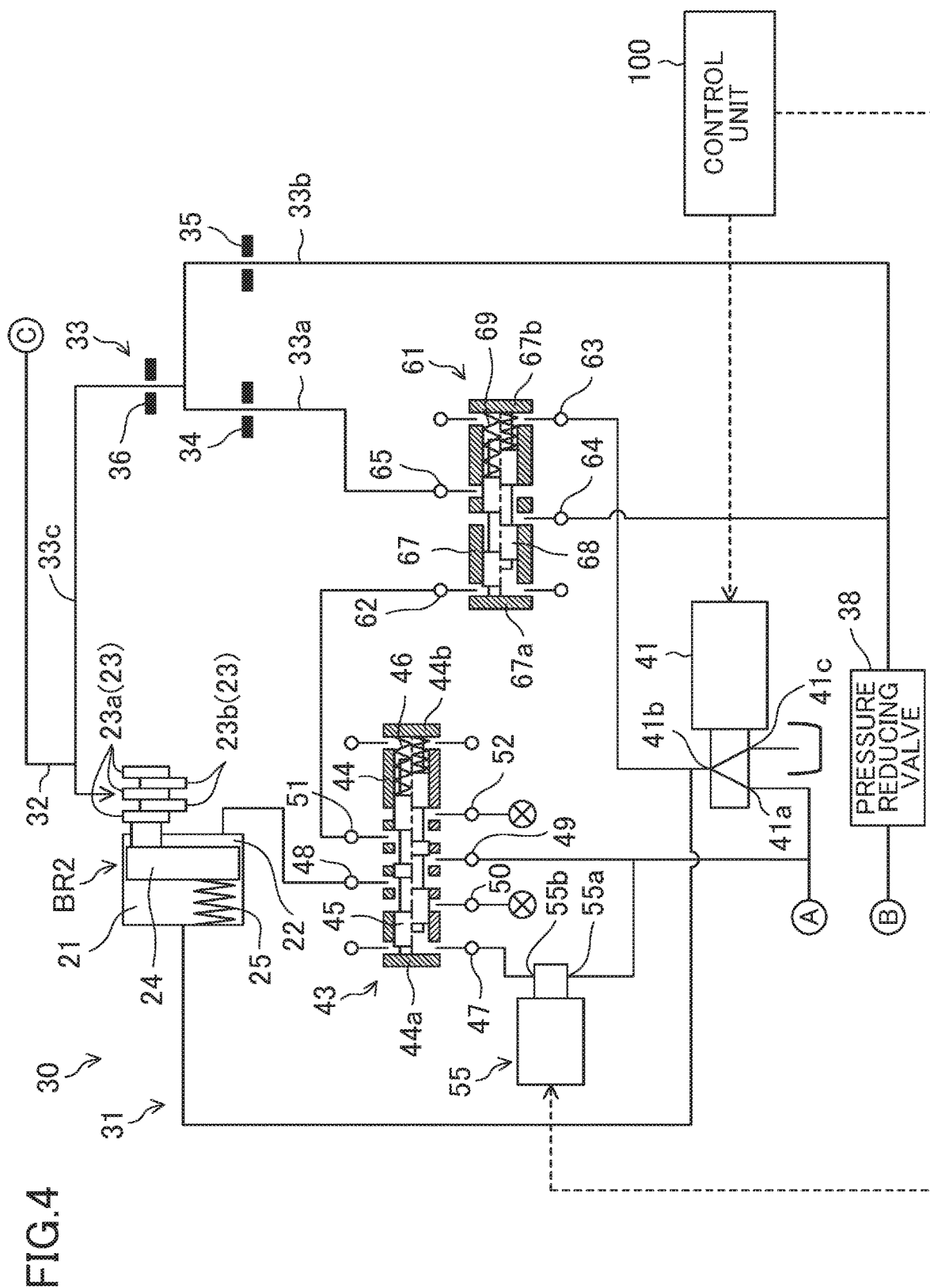
FIG. 4 is a circuit diagram of the hydraulic control circuit illustrating a hydraulic fluid supply circuit for supplying a hydraulic fluid to a second brake, and first and second lubricating oil supply circuits for supplying a lubricating oil to the second brake.

As shown in a simplified form in FIG. 4, the second brake BR2 includes a plurality of friction plates 23 arranged side by side in the axial direction of the transmission 3, a piston 24, and the engagement hydraulic chamber 21 and a release hydraulic chamber 22 arranged to sandwich the piston 24. Every other friction plate 23a of the plurality of friction plates 23 is connected to the transmission case 11, and the remaining friction plates 23b are connected to the third ring gear R3. When the second brake BR2 is slipping, the friction plates 23a and the friction plates 23b slide together. When the second brake BR2 is to be engaged, the supply of the hydraulic fluid to the engagement hydraulic chamber 21 causes the piston 24 to press the friction plates 23a and 23b in the axial direction of the transmission 3 so that the friction plates 23a and 23b engage with each other.

The second brake BR2 further includes a spring 25 that biases the friction plates 23a and 23b with a biasing force that can bring the friction plates 23a and 23b into contact with each other. The biasing force of the spring 25 and the supply of the hydraulic fluid in the ready-to-engage state can quickly shift the second brake BR2 to the slipping state. Then, if the pressure of the hydraulic fluid supplied to the engagement hydraulic chamber 21 of the second brake BR2 is equal to or greater than a first predetermined pressure, the second brake BR2 is fully engaged. The first predetermined pressure is set to be lower than a line pressure. When the hydraulic fluid is drained from the engagement hydraulic chamber 21, and the hydraulic fluid (at a line pressure) is supplied to the release hydraulic chamber 22, the second brake BR2 is released. The line pressure is a pressure regulated from the discharge pressure of the mechanical oil pump 4 to a predetermined magnitude by a regulator valve 7 (see FIG. 3), and is a source pressure of all the hydraulic fluid and the lubricating oil required in the transmission 3.

As shown in FIGS. 3 and 4, the hydraulic control circuit 30 of the transmission 3 includes a hydraulic fluid supply circuit 31 that supplies the hydraulic fluid to the second brake BR2 (the engagement hydraulic chamber 21 and the release hydraulic chamber 22), and a first lubricating oil supply circuit 32 and a second lubricating oil supply circuit 33 that supply the lubricating oil to the second brake BR2. The hydraulic fluid supply circuits 31 shown in FIGS. 3 and 4 are connected to each other at a point "A" in FIGS. 3 and 4. The first lubricating oil supply circuits 32 shown in FIGS. 3 and 4 are connected to each other at a point "C" in FIGS. 3 and 4. The second lubricating oil supply circuits 33 shown in FIGS. 3 and 4 are connected to each other at a point "B" in FIG. 3 and FIG. 4. The description of the hydraulic fluid supply circuits and the lubricating oil supply circuits to other frictional engagement elements than the second brake BR2 is omitted. The hydraulic fluid supply circuits to the engagement hydraulic chambers of the first clutch CL1 and the first brake BR1 are branched from the vicinity of the point "A" in FIGS. 3 and 4, respectively, and are directed toward the engagement hydraulic chambers of the first clutch CL1 and the first brake BR1 via ON/OFF solenoid valves for switching between supply and non-supply to the respective engagement hydraulic chambers.

The hydraulic control circuit 30 is provided with a selector valve 70 that is switched between a first state in which the oil discharged from the electric oil pump 5 can be supplied as the hydraulic fluid to the engagement hydraulic chamber 21 of the second brake BR2, and a second state in which the oil discharged from the electric oil pump 5 can be supplied as the lubricating oil to the second brake BR2 through the first lubricating oil supply circuit 32, depending on the magnitude of the discharge pressure of the mechanical oil pump 4.

In the present embodiment, a pair of shift valves (first and second shift valves 71, 81) constitutes the selector valve 70.

The oil discharged from the mechanical oil pump 4 (oil whose pressure is regulated to be the line pressure by the regulator valve 7) is supplied to the selector valve 70 (first and second shift valves 71, 81), and also to the second lubricating oil supply circuit 33 without passing through the selector valve 70.

The oil discharged from the electric oil pump 5 (oil that has passed through the orifice 8) is supplied to the first and second shift valves 71, 81. The oil discharged from the electric oil pump 5 (oil that has passed through the orifice 8) has a lower pressure than the line pressure, at which and the first clutch CL1 and the first brake BR1 can be fully engaged during the automatic stop of the engine 2.

The first shift valve 71 includes a spool 73 housed in a sleeve 72. The spool 73 is movable in an axial direction of the spool 73 between a first position where the spool 73 abuts against an end wall 72a of the sleeve 72 (an end wall on the left in FIG. 3) and a second position where the spool 73 abuts against another end wall 72b of the sleeve 72 (an end wall on the right in FIG. 3).

A first control port 74 to which the oil (oil at the line pressure) discharged from the mechanical oil pump 4 is supplied is provided at an end portion of the sleeve 72 on the first position side. A second control port 75 to which the oil (oil at a lower pressure than the line pressure) discharged from the electric oil pump 5 is supplied is provided at an end portion of the sleeve 72 on the second position side. When the mechanical oil pump 4 and the electric oil pump 5 are in operation, and when only the mechanical oil pump 4 is in operation, the spool 73 is positioned at the second position. When only the electric oil pump 5 is in operation, the spool 73 is positioned at the first position. When both of the mechanical oil pump 4 and the electric oil pump 5 are stopped, the spool 73 may be positioned at either position.

The sleeve 72 is provided with a port 76 to which the oil discharged from the mechanical oil pump 4 is supplied, a port 77 to which the oil discharged from the electric oil pump 5 is supplied, and a port 78 connected to the hydraulic fluid supply circuit 31.

When the spool 73 is at the first position, the ports 77 and 78 communicate with each other, and the ports 76 and 78 do not communicate with each other. When the spool 73 is at the second position, the ports 76 and 78 communicate with each other, and the ports 77 and 78 do not communicate with each other.

The second shift valve 81 includes a spool 83 housed in a sleeve 82. The spool 83 is movable in an axial direction of the spool 83 between a first position where the spool 83 abuts against an end wall 82a of the sleeve 82 (an end wall on the left in FIG. 3) and a second position where the spool 83 abuts against another end wall 82b of the sleeve 82 (an end wall on the right in FIG. 3). A compression coil spring 84 for biasing the spool 83 toward the second position is provided at an end portion of the sleeve 82 on the first position side.

A control port 85 to which the oil (oil at the line pressure) discharged from the mechanical oil pump 4 is supplied is provided at an end portion of the sleeve 82 on the second position side. When the mechanical oil pump 4 is stopped, the spool 83 is positioned at the second position by the compression coil spring 84. At this time, a port 86 to which the oil discharged from the electric oil pump 5 is supplied does not communicate with a port 87 connected to the first lubricating oil supply circuit 32. When the mechanical oil pump 4 is in operation, the oil at the line pressure is supplied to the control port 85 to position the spool 83 at the first position, and at this time, the ports 86 and 87 communicate with each other.

Therefore, when the mechanical oil pump 4 is stopped, i.e., when the discharge pressure of the mechanical oil pump 4 is zero, the spool 73 of the first shift valve 71 is positioned at the first position, and the spool 83 of the second shift valve 81 at the second position. At this time, the selector valve 70 is in the first state in which the oil discharged from the electric oil pump 5 can be supplied as the hydraulic fluid to the hydraulic fluid supply circuit 31 (by extension, to the engagement hydraulic chamber 21 of the second brake BR2). Thus, when the electric oil pump 5 is operated, the oil discharged from the electric oil pump 5 is supplied to the hydraulic fluid supply circuit 31. Even when the electric oil pump 5 is operated, the oil discharged from the electric oil pump 5 is not supplied to the first lubricating oil supply circuit 32.

On the other hand, when the mechanical oil pump 4 is in operation (when the engine 2 is in operation), i.e., when the discharge pressure of the mechanical oil pump 4 is the line pressure, the spool 73 of the first shift valve 71 is positioned at the second position, and the spool 83 of the second shift valve 81 at the first position. At this time, the selector valve 70 is in the second state in which the oil discharged from the electric oil pump 5 can be supplied as the lubricating oil to the second brake BR2 through the first lubricating oil supply circuit 32. Thus, when the electric oil pump 5 is operated, the oil discharged from the electric oil pump 5 is supplied to the first lubricating oil supply circuit 32. Even when the electric oil pump 5 is operated, the oil discharged from the electric oil pump 5 is not supplied to the hydraulic fluid supply circuit 31.

Further, the selector valve 70 is configured such that when the selector valve 70 is in the second state due to the operation of the engine 2, the oil discharged from the mechanical oil pump 4 can be supplied as the hydraulic fluid to the engagement hydraulic chamber 21 of the second brake BR2 through the hydraulic fluid supply circuit 31.

Figure 5:
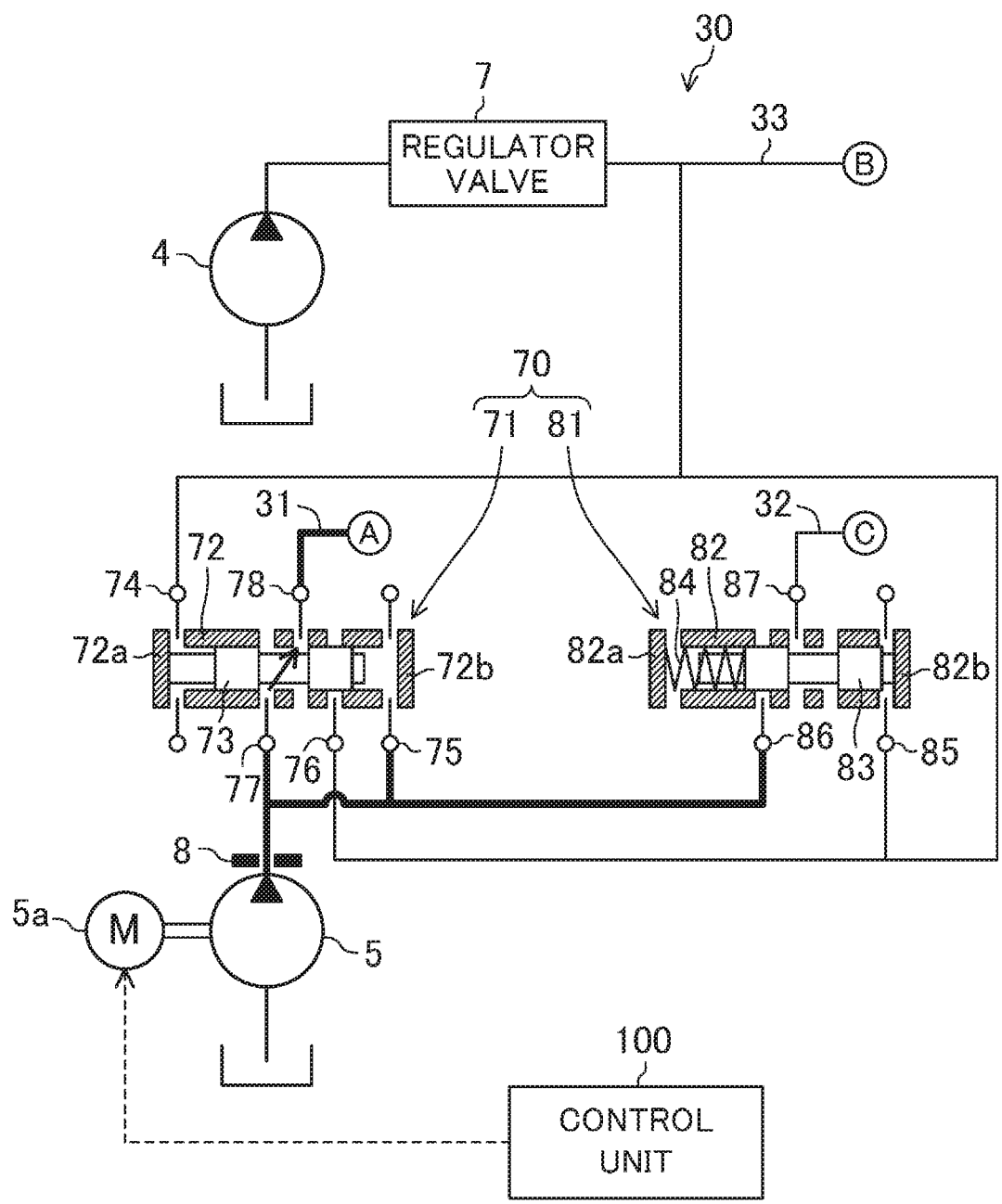
FIG. 5 is a view corresponding to FIG. 3, illustrating a state where a selector valve is in a first state and oil (hydraulic fluid) discharged from an electric oil pump is supplied to the hydraulic fluid supply circuit.

The electric motor 5a of the electric oil pump 5 is operated under control by a control unit 100, which will be described later, during the automatic stop of the engine 2 under the idle reduction control. During the automatic stop of the engine 2, the mechanical oil pump 4 is stopped. Thus, as shown in FIG. 5, the selector valve 70 is in the first state (the spool 73 of the first shift valve 71 is positioned at the first position and the spool 83 of the second shift valve 81 at the second position), and the oil discharged from the electric oil pump 5 is supplied to the hydraulic fluid supply circuit 31.

Figure 6:
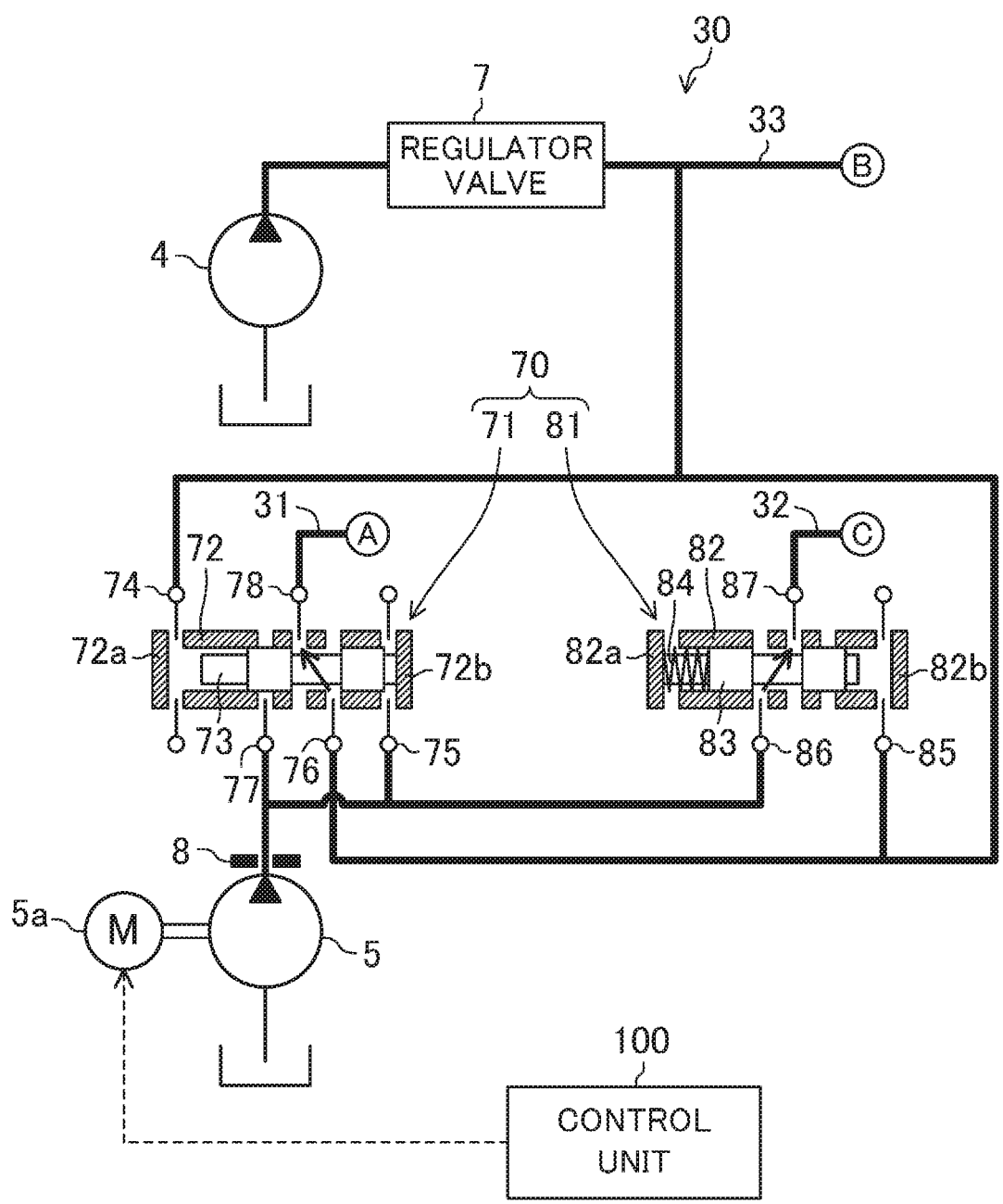
FIG. 6 is a view corresponding to FIG. 3, illustrating a state where the selector valve is in a second state, oil (hydraulic fluid) discharged from a mechanical oil pump is supplied to the hydraulic fluid supply circuit, and oil (lubricating oil) discharged from the electric oil pump is supplied to the first lubricating oil supply circuit.

During the specific period while the mechanical oil pump 4 is in operation, the electric motor 5a is operated (the electric oil pump 5 is operated). At this time, as shown in FIG. 6, the selector valve 70 is in the second state (the spool 73 of the first shift valve 71 is positioned at the second position and the spool 83 of the second shift valve 81 at the first position), the oil discharged from the mechanical oil pump 4 is supplied to the hydraulic fluid supply circuit 31, and the oil discharged from the electric oil pump 5 is supplied to the first lubricating oil supply circuit 32. When the predetermined period has passed since the second brake BR2 was fully engaged, the electric oil pump 5 is stopped. Even when the electric oil pump 5 is stopped, the selector valve 70 is maintained in the second state, and the oil discharged from the mechanical oil pump 4 is supplied to the hydraulic fluid supply circuit 31. After the stop of the electric oil pump 5, no oil is supplied to the first lubricating oil supply circuit 32. In FIGS. 5 and 6, a bold line indicates a portion through which the hydraulic fluid and the lubricating oil flow (the same applies to FIGS. 7 to 9).

As shown in FIG. 4, the hydraulic fluid supply circuit 31 has a pressure regulating solenoid valve 41 as a pressure regulator that regulates the pressure of the hydraulic fluid supplied to the engagement hydraulic chamber 21 of the second brake BR2. The pressure regulating solenoid valve 41 is comprised of a linear solenoid valve.

The oil (hydraulic fluid) discharged from the electric oil pump 5 or the mechanical oil pump 4 is inputted to an input port 41a of the pressure regulating solenoid valve 41. The pressure regulating solenoid valve 41 outputs the hydraulic fluid inputted from the input port 41a from an output port 41b with its pressure reduced or kept as it is. A surplus of the hydraulic fluid at the time of the pressure reduction in the pressure regulating solenoid valve 41 is drained from a drain port 41c. The hydraulic fluid delivered from the output port 41b of the pressure regulating solenoid valve 41 is supplied to the engagement hydraulic chamber 21.

During the automatic stop of the engine 2, the pressure regulating solenoid valve 41 reduces the pressure of the hydraulic fluid discharged from the electric oil pump 5 (hydraulic fluid that has passed through the orifice 8) to a pressure in the ready-to-engage state, and the hydraulic fluid at this pressure is delivered from the output port 41b. In this way, during the automatic stop of the engine 2, the second brake BR2 is brought into the ready-to-engage state.

When the mechanical oil pump 4 is in operation, the pressure (line pressure) of the hydraulic fluid discharged from the mechanical oil pump 4 is reduced or kept as it is by the pressure regulating solenoid valve 41, and the hydraulic fluid at this pressure is delivered from the output port 41b. The pressure of the hydraulic fluid delivered from the output port 41b (pressure regulated by the pressure regulating solenoid valve 41) varies within a range from zero to the line pressure. The hydraulic fluid delivered from the output port 41b is also supplied to a second control port 63 of a lubrication control valve 61, which will be described later.

The pressure regulating solenoid valve 41 is configured to: switch between the supply and non-supply of the hydraulic fluid to the engagement hydraulic chamber 21 of the second brake BR2; gradually raise the pressure (regulated pressure) of the hydraulic fluid supplied to the engagement hydraulic chamber 21 from the pressure in the ready-to-engage state to the first predetermined pressure when the second brake BR2 is to be engaged at the start of the vehicle; and then raise the pressure to the line pressure higher than the first predetermined pressure. When no hydraulic fluid is supplied to the engagement hydraulic chamber 21, the pressure regulating solenoid valve 41 sets the regulated pressure to zero. At this time, the hydraulic fluid in the engagement hydraulic chamber 21 is drained. Further, when the second brake BR2 is to be engaged at timing other than the start of the vehicle, the pressure regulating solenoid valve 41 raises the regulated pressure from zero to the line pressure at once.

The hydraulic fluid supply circuit 31 further includes a release selector valve 43 for switching between the supply and non-supply of the hydraulic fluid to the release hydraulic chamber 22 of the second brake BR2. The release selector valve 43 is operated in response to the operation of an ON/OFF solenoid valve 55 to switch between the supply and non-supply of the hydraulic fluid to the release hydraulic chamber 22.

Specifically, the hydraulic fluid at the line pressure is inputted to an input port 55a of the ON/OFF solenoid valve 55 when the mechanical oil pump 4 is in operation, and is delivered as it is from an output port 55b when the ON/OFF solenoid valve 55 is turned ON. When the ON/OFF solenoid valve 55 is turned OFF, the flow of the hydraulic fluid is blocked, so that no hydraulic fluid is delivered from the output port 55b. The ON/OFF solenoid valve 55 is turned OFF at the gear positions where the second brake BR2 is engaged (first to fifth gears and reverse gear), and is turned ON at gear positions where the second brake BR2 is released (sixth to eighth gears). During the automatic stop of the engine 2, the ON/OFF solenoid valve 55 is turned OFF.

The release selector valve 43 has a spool 45 housed in a sleeve 44. The spool 45 is movable in an axial direction of the spool 45 between a first position where the spool 45 abuts against an end wall 44a of the sleeve 44 (an end wall on the left in FIG. 4) and a second position where the spool 45 abuts against another end wall 44b of the sleeve 44 (an end wall on the right in FIG. 4). A compression coil spring 46 for biasing the spool 45 toward the first position is provided at an end portion of the sleeve 44 on the second position side.

A control port 47 connected to the output port 55*b* of the ON/OFF solenoid valve 55 is provided at an end portion of the sleeve 44 on the first position side. When the ON/OFF solenoid valve 55 is OFF, the hydraulic fluid at the line pressure is not supplied to the control port 47, and the spool 45 is positioned at the first position under the biasing force of the compression coil spring 46. When the ON/OFF solenoid valve 55 is ON, the hydraulic fluid at the line pressure is supplied to the control port 47, and the spool 45 is positioned at the second position against the biasing force of the compression coil spring 46.

Figure 8:
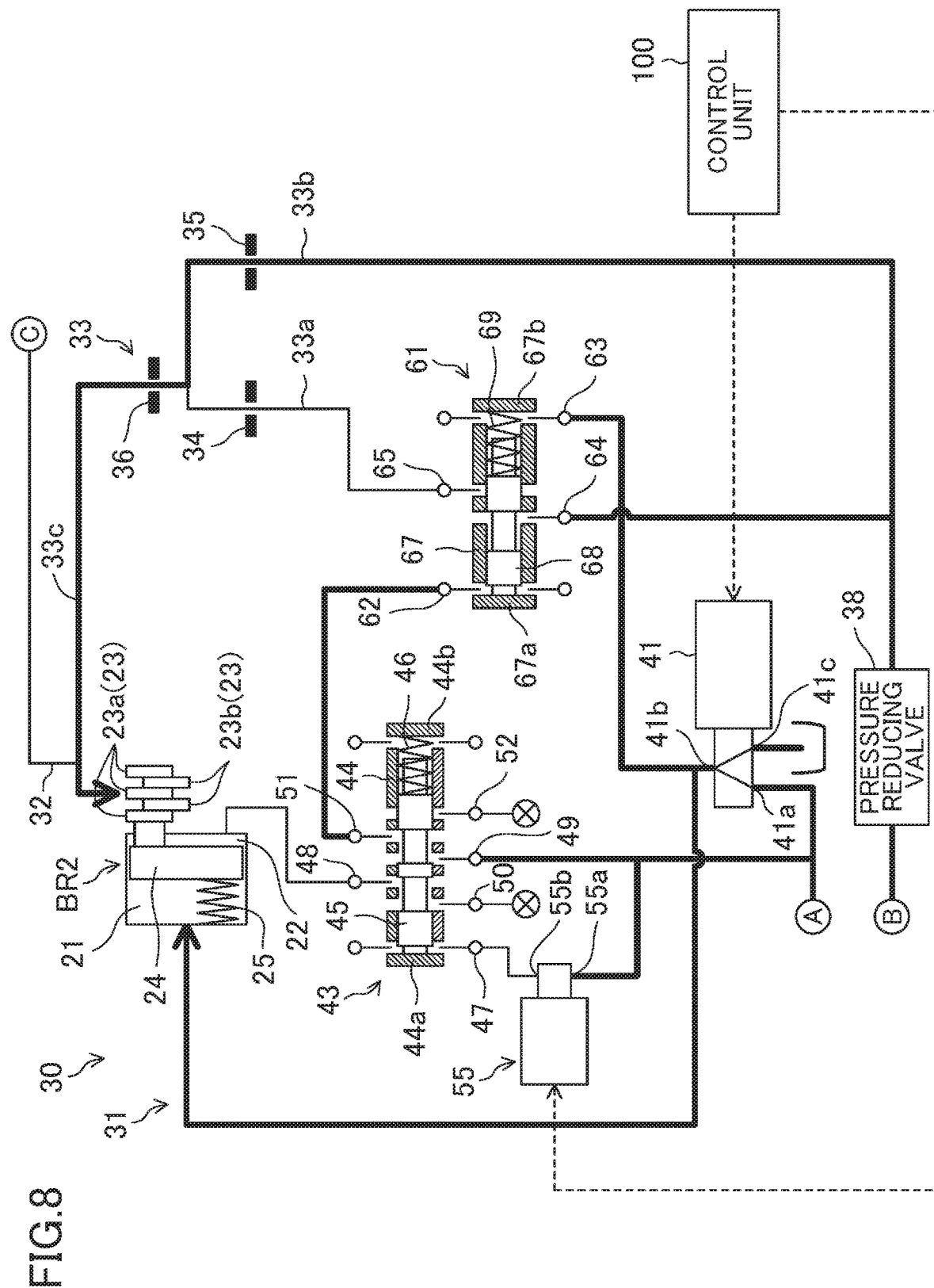
FIG. 8 is a view corresponding to FIG. 4, illustrating a state where the hydraulic fluid at the line pressure is supplied to the first control port of the lubrication control valve, and the hydraulic fluid at the regulated pressure (equal to or greater than the second predetermined pressure) regulated by the pressure regulating solenoid valve is supplied to the second control port of the lubrication control valve.
Figure 9:
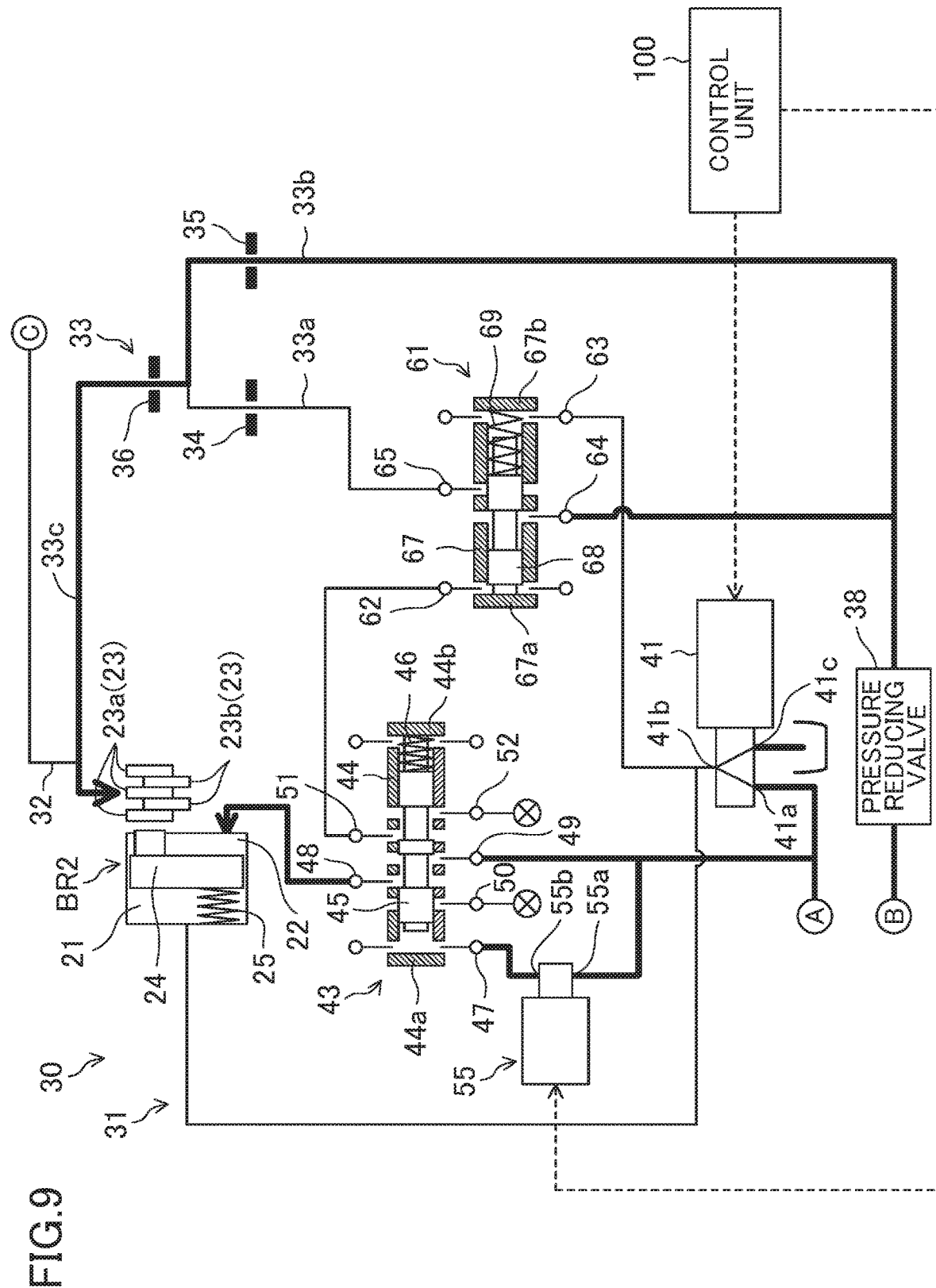
FIG. 9 is a view corresponding to FIG. 4, illustrating a state where the hydraulic fluid at the line pressure is supplied to a release hydraulic chamber of a second brake, and no hydraulic fluid is supplied to the first and second control ports of the lubrication control valve.

When the spool 45 is at the second position (when the ON/OFF solenoid valve 55 is ON), a port 48 connected to the release hydraulic chamber 22 of the second brake BR2 communicates with a port 49 to which the hydraulic fluid at the line pressure is supplied, which causes the hydraulic fluid at the line pressure to be supplied to the release hydraulic chamber 22 (see FIG. 9). When the spool 45 is at the first position (when the ON/OFF solenoid valve 55 is OFF), the port 48 connected to the release hydraulic chamber 22 communicates with a drain port 50, which causes the hydraulic fluid in the release hydraulic chamber 22 to be drained (see FIGS. 7 and 8).

A control unit 100 controls the operation of the electric motor 5*a* of the electric oil pump 5, the pressure regulating solenoid valve 41, and the ON/OFF solenoid valve 55. The control unit 100 is a well-known microcomputer-based controller, and includes a central processing unit (CPU) that executes computer programs (including a basic control program such as an operating system (OS) and an application program for realizing a specific function on the OS), memory configured as, e.g., RAM or ROM, and storing the computer programs and data, and an input/output (I/O) bus for inputting and outputting electrical signals.

The control unit 100 receives various kinds of information (e.g., information about a range position of a shift lever of the vehicle, information about an accelerator position of the vehicle, and information about a vehicle speed) for automatically switching the gear position of the transmission 3 according to the running state of the vehicle, and various kinds of information for executing the idle reduction control. The control unit 100 controls the operation of the electric motor 5*a*, the pressure regulating solenoid valve 41, and the ON/OFF solenoid valve 55, and executes the idle reduction control, in accordance with the inputted information. The control unit 100 controls the operation of valves respectively provided for the hydraulic fluid supply circuits and the lubricating oil supply circuits to the other frictional engagement elements than the second brake BR2, in accordance with the information.

In this embodiment, when the spool 45 of the release selector valve 43 is at the first position, i.e., at the gear position where the second brake BR2 is engaged, the port 49 to which the hydraulic fluid at the line pressure is supplied communicates with a port 51 connected to a first control port 62 of the lubrication control valve 61 arranged in the second lubricating oil supply circuit 33 (more specifically, a large-diameter-orifice oil passage 33*a* to be described later), thereby supplying the hydraulic fluid at the line pressure to the first control port 62 of the lubrication control valve 61. When the spool 45 of the release selector valve 43 is at the second position, i.e., at the gear position where the second brake BR2 is released, the port 51 connected to the first control port 62 of the lubrication control valve 61 communicates with a drain port 52, thereby draining the hydraulic fluid from the first control port 62.

The second lubricating oil supply circuit 33 includes the large-diameter-orifice oil passage 33*a* and a small-diameter-orifice oil passage 33*b* which are connected in parallel to each other. The large-diameter-orifice oil passage 33*a* and the small-diameter-orifice oil passage 33*b* are respectively provided with a large diameter orifice 34 and a small diameter orifice 35 having different diameters. Thus, the lubricating oil flows through the large-diameter-orifice oil passage 33*a* at a greater flow rate than the lubricating oil flowing through the small-diameter-orifice oil passage 33*b*.

The oil discharged from the mechanical oil pump 4 has its pressure reduced by a pressure reducing valve 38, and is supplied as the lubricating oil to the large-diameter-orifice oil passage 33*a* and the small-diameter-orifice oil passage 33*b* without passing through the selector valve 70. The pressure reducing valve 38 reduces the pressure of the oil discharged from the mechanical oil pump 4 from the line pressure to a preset pressure (a pressure suitable for lubrication).

The large-diameter-orifice oil passage 33*a* and the small-diameter-orifice oil passage 33*b* meet together at their downstream ends to form a collective oil passage 33*c*, and the lubricating oil is supplied to the second brake BR2 (in particular, the friction plates 23) through the collective oil passage 33*c*. The collective oil passage 33*c* passes inside the peripheral wall 11*a* of the transmission case 11 to reach an oil passage opening located near the second brake BR2. The collective oil passage 33*c* is also provided with an orifice 36. The orifice 36 has a larger diameter than the large diameter orifice 34 arranged in the large-diameter-orifice oil passage 33*a*, and allows the lubricating oil to flow through the collective oil passage 33*c* at a flow rate substantially the same as the sum of the flow rate of the lubricating oil flowing through the large-diameter-orifice oil passage 33*a* and the flow rate of the lubricating oil flowing through the small-diameter-orifice oil passage 33*b*.

Here, the first lubricating oil supply circuit 32 is connected to the vicinity of a downstream end of the second lubricating oil supply circuit 33, i.e., near the oil passage opening of the collective oil passage 33*c*. In this configuration, the first lubricating oil supply circuit 32 is connected to a portion of the second lubricating oil supply circuit 33 where the oil pressure is relatively low, which can reduce the pressure of the lubricating oil supplied from the electric oil pump 5 to the second brake BR2 via the first and second lubricating oil supply circuits 32 and 33. The first lubricating oil supply circuit 32 may be connected anywhere as long as it is connected to the collective oil passage 33*c* of the second lubricating oil supply circuit 33.

The lubrication control valve 61 is arranged in the large-diameter-orifice oil passage 33*a*. An upstream portion and downstream portion of the large-diameter-orifice oil passage 33*a* are respectively connected to two ports 64, 65 of the lubrication control valve 61, and the operation of the lubrication control valve 61 allows the upstream and downstream portions to communicate with, or to be blocked from, each other.

The lubrication control valve 61 includes a spool 68 housed in a sleeve 67. The spool 68 is movable in an axial direction of the spool 68 between a first position where the spool 68 abuts against an end wall 67*a* of the sleeve 67 (an end wall on the left in FIG. 3) and a second position where the spool 68 abuts against another end wall 67*b* of the sleeve 67 (an end wall on the right in FIG. 3). A compression coil spring 69 for biasing the spool 68 toward the first position is provided at an end portion of the sleeve 67 on the second position side.

When the spool 68 of the lubrication control valve 61 is at the second position, the two ports 64, 65 communicate with each other, thereby allowing the upstream and downstream portions of the large-diameter-orifice oil passage 33a to communicate with each other (the large-diameter-orifice oil passage 33a is communicating). When the spool 68 is at the first position, the two ports 64, 65 do communicate with each other, thereby blocking the upstream and downstream portions of the large-diameter-orifice oil passage 33a from each other (the large-diameter-orifice oil passage 33a is blocked).

The first control port 62 is provided at an end portion of the sleeve 67 on the first position side. The second control port 63 connected to the output port 41b of the pressure regulating solenoid valve 41 is provided at an end portion of the sleeve 67 on the second position side. The lubrication control valve 61 (spool 68) is operated in accordance with a differential pressure between the pressure of the hydraulic fluid in the first control port 62 and the pressure of the hydraulic fluid in the second control port 63. Specifically, the lubrication control valve 61 is operated in accordance with a difference between the biasing force of the compression coil spring 69 and a value obtained by subtracting a value which is converted from the pressure of the hydraulic fluid in the first control port 62 into a pressing force of the spool 68 from a value which is converted into a pressing force of the spool 68 from the pressure of the hydraulic fluid in the second control port 63.

Figure 7:
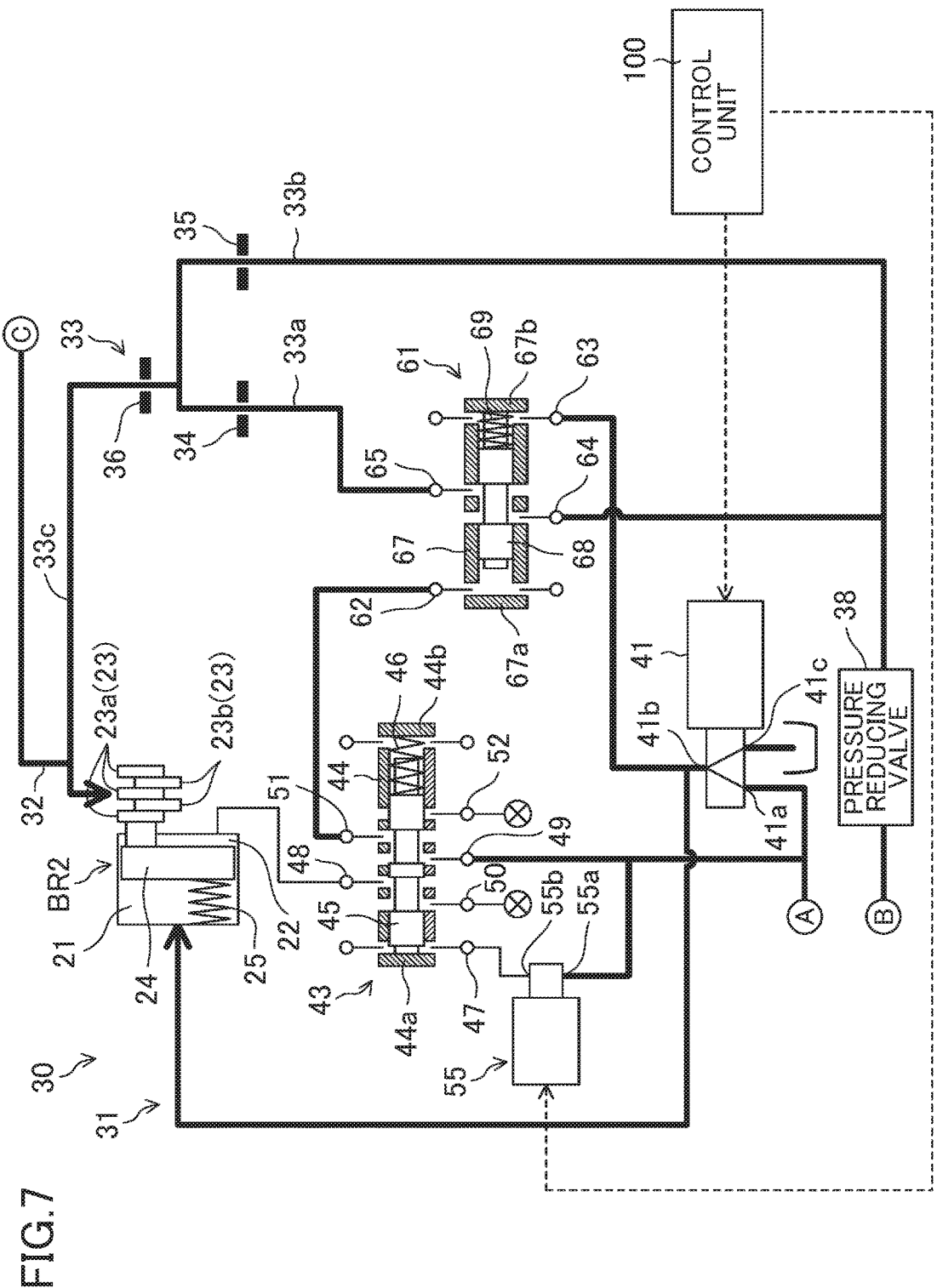
FIG. 7 is a view corresponding to FIG. 4, illustrating a state where a hydraulic fluid at a line pressure is supplied to a first control port of a lubrication control valve, and a hydraulic fluid at a regulated pressure (lower than a second predetermined pressure) regulated by a pressure regulating solenoid valve is supplied to a second control port of the lubrication control valve.

As described above, in the gear position where the second brake BR2 is engaged, the hydraulic fluid at the line pressure is supplied to the first control port 62 of the lubrication control valve 61 from the release selector valve 43. On the other hand, the hydraulic fluid at the regulated pressure is supplied to the second control port 63 from the pressure regulating solenoid valve 41. When the second brake BR2 is to be engaged at the start of the vehicle, the regulated pressure gradually rises from the pressure in the ready-to-engage state to the first predetermined pressure, and then rises to the line pressure at once. The lubrication control valve 61 is configured such that the spool 68 is positioned at the second position as shown in FIG. 7 when the regulated pressure is lower than a second predetermined pressure which is equal to or greater than the first predetermined pressure and lower than the line pressure, and that the spool 68 is positioned at the first position as shown in FIG. 8 when the regulated pressure is equal to or greater than the second predetermined pressure. In this manner, when the second brake BR2 is to be engaged at the start of the vehicle, the lubrication control valve 61 is operated in accordance with the differential pressure between the line pressure and the regulated pressure.

When the second brake BR2 is to be engaged at the start of the vehicle, the regulated pressure gradually rises from the pressure in the ready-to-engage state to the first predetermined pressure, and thus, the second brake BR2 in the released state is brought into the slipping state, and then into the fully engaged state. This allows the vehicle to be started smoothly even when no torque converter is provided between the output shaft of the drive source and the input shaft 12 of the transmission 3.

As described above, when the second brake BR2 is to be engaged at the start of the vehicle, if the regulated pressure is lower than the second predetermined pressure, i.e., if the differential pressure is greater than a predetermined threshold value (line pressure minus the second predetermined pressure in this embodiment), the spool 68 is positioned at the second position, which brings the large-diameter-orifice oil passage 33a into a communicating state. As a result, as shown in FIG. 7, the lubricating oil from the pressure reducing valve 38 passes through both of the large-diameter-orifice oil passage 33a and the small-diameter-orifice oil passage 33b to be supplied to the second brake BR2.

When the second brake BR2 is to be engaged at the start of the vehicle, if the regulated pressure is equal to or greater than the second predetermined pressure, i.e., if the differential pressure is equal to or lower than the predetermined threshold value, the spool 68 is positioned at the first position, which blocks the large-diameter-orifice oil passage 33a. As a result, as shown in FIG. 8, the lubricating oil from the pressure reducing valve 38 passes only through the small-diameter orifice oil passage 33b to be supplied to the second brake BR2.

Therefore, when the second brake BR2 is to be engaged at the start of the vehicle, the lubrication control valve 61 is operated such that the flow rate of the lubricating oil supplied to the second brake BR2 through the second lubricating oil supply circuit 33 when the differential pressure exceeds the predetermined threshold value becomes greater than the flow rate of the lubricating oil when the differential pressure is equal to or lower than the predetermined threshold value. That is, when the second brake BR2 is slipping, a sufficient amount of lubricating oil required for cooling and lubricating the second brake BR2 (in particular, the friction plates 23) is supplied to the second brake BR2. After the second brake BR2 is fully engaged (more specifically, after the predetermined period has passed since the second brake was fully engaged), a large amount of lubricating oil is no longer necessary. Thus, the flow rate of the lubricating oil supplied to the second brake BR2 through the second lubricating oil supply circuit 33 is reduced.

As described above, when the selector valve 70 is in the second state, the electric oil pump 5 is operated for the specific period (a period including a period during which the second brake BR2 is slipping and a period until the predetermined period has passed since the second brake BR2 was fully engaged thereafter). In the present embodiment, the predetermined period is a period from when the regulated pressure reaches the first predetermined pressure to immediately before the pressure reaches the second predetermined pressure. That is, when the lubricating oil from the mechanical oil pump 4 is supplied to the second brake BR through both of the large-diameter-orifice oil passage 33a and small-diameter-orifice oil passage 33b of the second lubricating oil supply circuit 33, a large amount of lubricating oil is additionally supplied to the second brake BR2 through the first lubricating oil supply circuit 32. When the regulated pressure becomes equal to or greater than the second predetermined pressure (when the differential pressure becomes equal to or lower than the predetermined threshold value), the electric oil pump 5 is stopped, and thereafter, the electric oil pump 5 is kept stopped until the vehicle stops. While the electric oil pump 5 is stopped, the lubricating oil is supplied to the second brake BR2 only through the small-diameter-orifice oil passage 33b of the second lubricating oil supply circuit 33. Thus, the loss in stirring the lubricating oil by the rotary member (in particular, the friction plates 23b) of the second brake BR2 can be reduced, thereby keeping fuel economy from deteriorating.

The second predetermined pressure may be equal to the first predetermined pressure. In this case, the electric oil pump 5 may be operated while the second brake BR2 is slipping, and may be stopped after the electric oil pump 5 is fully engaged.

Here, the control unit 100 controls the operation of the electric oil pump 5 while the selector valve 70 is in the second state in accordance with a control signal sent to the pressure regulating solenoid valve 41 which is regulating the pressure of the hydraulic fluid to be supplied to the engagement hydraulic chamber 21 of the second brake BR2. Specifically, since the control signal indicates the magnitude of the regulated pressure, whether the second brake BR2 is slipping or not, and how long the predetermined period, can be determined. Accordingly, the operation of the electric oil pump 5 can be controlled in synchronization with the control of the pressure regulating solenoid valve 41 by the control unit 100. This facilitates the operation control of the electric oil pump 5.

When the second brake BR2 is to be engaged at timing other than the start of the vehicle, the regulated pressure is shifted from zero to the line pressure at once, and the spool 68 is also moved to the first position at once. As a result, the large-diameter-orifice oil passage 33a is basically not communicated, and the lubricating oil from the pressure reducing valve 38 is supplied to the second brake BR2 only through the small-diameter-orifice oil passage 33b (see FIG. 8).

When the second brake BR2 is not engaged, the hydraulic fluid is not supplied at all to the first and second control ports 62, 63 of the lubrication control valve 61, but is drained (the pressure of the hydraulic fluid in the first and second control ports 62, 63 is zero). Thus, as shown in FIG. 8, the spool 68 is positioned at the first position by the compression coil spring 69, and at this time, the lubricating oil from the pressure reduction valve 38 is supplied to the second brake BR2 only through the small-diameter-orifice oil passage 33b. When the second brake BR2 is not engaged, the hydraulic fluid is not supplied to the engagement hydraulic chamber 21 of the second brake BR2, but is supplied to the release hydraulic chamber 22 (see FIG. 9).

During the automatic stop of the engine 2, the hydraulic fluid discharged from the electric oil pump 5 is supplied to the first control port 62 of the lubrication control valve 61, and the hydraulic fluid whose pressure is regulated by the pressure regulating solenoid valve 41 to that in the ready-to-engage state is supplied to the second control port 63. Therefore, the spool 68 of the lubrication control valve 61 is positioned at the second position, and the large-diameter-orifice oil passage 33a is brought into the communicating state. However, since the mechanical oil pump 4 is not operated, no lubricating oil is supplied to the second lubricating oil supply circuit 33 (the large-diameter-orifice oil passage 33a and the small-diameter-orifice oil passage 33b). During the automatic stop of the engine 2, no lubricating oil is supplied to the first lubricating oil supply circuit 32, either.

Therefore, in this embodiment, the hydraulic control circuit 30 is provided with the selector valve 70 that is switched between the first state in which the oil discharged from the electric oil pump 5 can be supplied as the hydraulic fluid to the engagement hydraulic chamber 21 of the second brake BR2, and the second state in which the oil discharged from the electric oil pump 5 can be supplied as the lubricating oil to the second brake BR2 through the first lubricating oil supply circuit 32, depending on the magnitude of the discharge pressure of the mechanical oil pump 4. This makes it possible to switch the selector valve 70 between the first and second states depending on whether the mechanical oil pump 4 is operated or stopped. As a result, an expensive selector valve such as a solenoid valve for the switching, and the control of the selector valve 70 are no longer necessary. With such a simple circuit configuration, the oil (hydraulic fluid) from the electric oil pump 5 can be supplied to the engagement hydraulic chamber 21 of the second brake BR2 while the mechanical oil pump 4 is stopped, and the oil (lubricating oil) from the electric oil pump 5 can be supplied to the second brake BR while the mechanical oil pump 4 is in operation and particularly when the second brake BR2 is slipping.

The present disclosure is not limited to this embodiment. Any substitution can be made within the scope of the claims as appropriate.

For example, in the above embodiment, the second brake BR2 has been described as an example of the vehicle-starting frictional engagement element, but the vehicle-starting frictional engagement element may be any vehicle-starting frictional engagement element as long as it is engaged at the first gear position. In the configuration of the transmission 3 of the above embodiment, the vehicle-starting frictional engagement element may be the first clutch CL1 or the first brake BR1. However, in a preferred embodiment, the vehicle-starting frictional engagement element is comprised of a brake, among the clutches and the brakes. In this manner, when the vehicle-starting frictional engagement element is comprised of the brake, the lubricating oil can be directly supplied to the vehicle-starting frictional engagement element (brake) from the peripheral wall 11a of the transmission case 11. This can make the diameter of the oil passage relatively large. This facilitates the supply of a sufficient amount of lubricating oil to the vehicle-starting frictional engagement element which is in the slipping state.

The foregoing embodiments are merely examples in nature, and the scope of the present disclosure should not be interpreted in a limited manner. The scope of the present invention is defined by the appended claims, and all variations and modifications belonging to a range equivalent to the range of the claims are within the scope of the present invention.

INDUSTRIAL APPLICABILITY

The present invention is useful for a power train device for a vehicle, the power train device including a drive source that drives a vehicle, a transmission that receives power transmitted from the drive source, a mechanical oil pump mechanically driven by the drive source, and an electric oil pump driven by an electric motor different from the drive source.

DESCRIPTION OF REFERENCE CHARACTERS

1 Power Train Device
2 Engine (Drive Source)
3 Transmission
4 Mechanical Oil Pump
5 Electric Oil Pump
5a Electric Motor
31 Hydraulic Fluid Supply Circuit
32 First Lubricating Oil Supply Circuit
33 Second Lubricating Oil Supply Circuit
41 Pressure Regulating Solenoid Valve (Pressure Regulator)
61 Control Valve
70 Selector Valve
71 First Shift Valve
72 Second Shift Valve
BR2 Second Brake (Vehicle-Starting Frictional Engagement Element)

The invention claimed is:

1. A power train device for a vehicle, the power train device comprising:
an engine that drives the vehicle;
a transmission that receives power transmitted from the engine;
a mechanical oil pump mechanically driven by the engine;
an electric oil pump driven by an electric motor different from the engine;
a vehicle-starting frictional engagement element that is provided for the transmission and is engaged at the start of the vehicle through supply of a hydraulic fluid to an engagement hydraulic chamber; and
a selector valve that is switched between a first state in which oil discharged from the electric oil pump is able to be supplied as a hydraulic fluid to the engagement hydraulic chamber of the vehicle-starting frictional engagement element, and a second state in which the oil discharged from the electric oil pump is able to be supplied as a lubricating oil to the vehicle-starting frictional engagement element through a first lubricating oil supply circuit, depending on a magnitude of a discharge pressure of the mechanical oil pump, wherein
the selector valve is configured to be brought into the first state while the mechanical oil pump is stopped, and into the second state when the mechanical oil pump is in operation, and to be able to supply oil discharged from the mechanical oil pump as the hydraulic fluid to the engagement hydraulic chamber of the vehicle-starting frictional engagement element while the selector valve is in the second state,
the power train device further comprises:
a pressure regulator that regulates a pressure of the oil supplied as the hydraulic fluid to the engagement hydraulic chamber of the vehicle-starting frictional engagement element while the selector valve is in the second state; and
a lubrication control valve arranged in a second lubricating oil supply circuit that supplies the oil from the mechanical oil pump as the lubricating oil to the vehicle-starting frictional engagement element without passing through the selector valve when the mechanical oil pump is in operation, and
the lubrication control valve is operated in accordance with a differential pressure between a line pressure and a regulated pressure which is regulated by the pressure regulator, and is operated such that a flow rate of the oil supplied to the vehicle-starting frictional engagement element through the second lubricating oil supply circuit when the differential pressure exceeds a predetermined threshold value becomes greater than a flow rate of the oil when the differential pressure is equal to or lower than the predetermined threshold value.

2. The power train device of claim 1, wherein
the first lubricating oil supply circuit is connected to a vicinity of a downstream end of the second lubricating oil supply circuit.

* * * * *